(12) United States Patent
Althouse et al.

(10) Patent No.: US 11,313,769 B2
(45) Date of Patent: Apr. 26, 2022

(54) PARTICULATE SAMPLER AND METHOD OF USING SAME

(71) Applicants: Ronald Kim Althouse, Tisdale (CA); William McLintock Martin, Saskatoon (CA)

(72) Inventors: Ronald Kim Althouse, Tisdale (CA); William McLintock Martin, Saskatoon (CA)

(73) Assignee: TISDALE'S AG SAMPLING SYSTEMS INC., Tisdale (CA)

( * ) Notice: Subject to any disclaimer, the term of this patent is extended or adjusted under 35 U.S.C. 154(b) by 37 days.

(21) Appl. No.: 16/255,245

(22) Filed: Jan. 23, 2019

(65) Prior Publication Data

US 2019/0383709 A1    Dec. 19, 2019

(51) Int. Cl.
*G01N 1/20* (2006.01)
*G01N 35/04* (2006.01)

(52) U.S. Cl.
CPC .......... *G01N 1/2035* (2013.01); *G01N 35/04* (2013.01); *G01N 2001/2028* (2013.01)

(58) Field of Classification Search
CPC ........... G01N 1/2035; G01N 1/20; G01N 2001/2007; G01N 35/04; G01N 2001/2028
See application file for complete search history.

(56) References Cited

U.S. PATENT DOCUMENTS

| | | | | |
|---|---|---|---|---|
| 4,082,003 A | * | 4/1978 | Hentschel, Jr. | G01N 1/2035 73/863.83 |
| 4,408,947 A | * | 10/1983 | Lenski | A01D 41/1208 414/526 |
| 4,669,945 A | * | 6/1987 | Pollard | B65G 33/32 198/313 |
| 4,743,155 A | * | 5/1988 | Carey | G01N 1/20 198/537 |
| 4,918,999 A | * | 4/1990 | Wenshau | G01N 1/20 73/863.54 |
| 5,305,866 A | * | 4/1994 | Stewart | B65G 65/22 198/311 |

(Continued)

FOREIGN PATENT DOCUMENTS

| | | | | |
|---|---|---|---|---|
| DE | 2604891 A1 | * | 8/1977 | G01N 1/20 |
| WO | WO-2009026669 A1 | * | 3/2009 | A01D 75/02 |

*Primary Examiner* — Herbert K Roberts
*Assistant Examiner* — Fatemeh Esfandiari Nia
(74) *Attorney, Agent, or Firm* — Gearhart Law, LLC (57) ABSTRACT

A sampler for use in the control extraction of material samples from a flow stream of particulate material within a tubular conveyor. A rotatable extractor extends through a sample aperture in the body of the conveyor and when actuated will permit the periodic capture and discharge of particulate material samples of a controlled size from the flow stream to a sample discharge outlet outside of the conveyor. The rotatable extractor does not interfere with any material flow assistance device within the conveyor, and in operation of the conveyor, the extractor will capture periodic samples from the operating flow stream for discharge at the sample discharge outlet. The rotatable extractor could comprise an extractor flighting, extending into the flow stream and out through a discharge tube or might comprise a rotationally mounted extractor to adapted to permit periodic sampling during rotation of the tube.

9 Claims, 8 Drawing Sheets

(56) References Cited

U.S. PATENT DOCUMENTS 5,385,058 A * 1/1995 Krauss .................... G01N 1/20
  73/863.54
2016/0082478 A1* 3/2016 Walton .................... B07B 1/26
  209/288

* cited by examiner

PARTICULATE SAMPLER AND METHOD OF USING SAME

CROSS-REFERENCE TO RELATED APPLICATIONS

This application claims the benefit of Canadian Patent Application No. 3008843 filed Jun. 19, 2018, the entire contents of which are hereby incorporated by reference.

FIELD OF THE INVENTION

The invention is in the field of particulate materials handling systems, and more specifically relates to a sampler for use with a particulate conveyor to obtain periodic samples of a controlled size from the flow stream within the conveyor.

BACKGROUND

There are many material handling operations in which particulate conveyors such as augers and belt conveyors are used to move large volumes of particulate material. These include agricultural operations where grain and similar products may be moved, as well as other industrial applications.

In the operation of augers or belt conveyors, it is sometimes desirable to obtain samples of the product moving through the flow stream in the conveyor. For example, in agricultural operations, the processing of harvested crops, in particular, grain crops, lentils and other seed like products, it is often desirable or even required that samples be taken of the product during harvesting operations as part of the crop grading and inspection process. Grading is an important step in the operation as it is one factor in determining the value of the crop being harvested, and in some jurisdictions, inspection by government agencies is mandatory. Both in agricultural and other industrial applications many different types of sampling methodologies are used. A variety of samplers have been developed to permit sampling of crops as they are being conveyed to a storage container, many of which are complex, expensive to manufacture, and difficult to install on existing equipment. For example, U.S. Pat. No. 1,899,126 (Woodside) discloses a particulate sampler comprising a plurality of buckets and a complex drive system to allow for the collection of grain samples. U.S. Pat. No. 4,037,476 (McCrabb) discloses a grain probe comprising a drive mechanism to insert the probe into a volume of grain and then remove a sample. U.S. Pat. No. 5,604,996 (Bestwick et al.) discloses a grain bin that includes a sloped drying floor, and modifications in the drying floor that include a chute that can direct a portion of grain moving down the slope of the drying floor for retention as a sample of the product in the bin. Each of these examples is limited in that the mechanisms are either complex, bulky and difficult to manufacture, or they are designed to be used with static volumes of grain, or grain contained in bins.

High-volume material conveyors such as large diameter augers or belt conveyors or the like present issues in terms of acquiring a consistent sample from the flow stream in the device—many different types of devices have been created, but they typically rely upon manually triggering the acquisition of a sample or the opening of a valve or a gate on the conveyor which simply results in the capture of a sample from a single portion of the flow stream in the device. If it were possible to obtain periodically captured samples from the flow stream in such a conveyor without the need for manually triggering each of the periodic samples, those could then be aggregated to provide a consolidated sample which could be used in grading or other sampling applications. This would be equally applicable in agricultural as well as in other industrial particulate transfer applications, and it will be understood that this would be commercially desirable in any such industry.

SUMMARY OF THE INVENTION

As outlined above, the intention and commercial purpose of the present invention is to provide a sampler for use in the controlled extraction of material samples from a flow stream of particulate material within a tubular conveyor. A typical tubular conveyor contains a material flow assistance device within a tubular body for the movement of the flow stream within the conveyor. For the sampler of the present invention to be used, the conveyor would comprise a sample aperture which allowed material flow from the flow stream to the outside of the conveyor body at a sample location. The primary types of conveyors in respect of which the sampler of the present invention could be used would be augers or belt conveyors. Other types of tubular particulate transfer systems could also be adapted for use in accordance with the sampler of the present invention—for example even a pneumatic transfer apparatus could be altered to permit the use of the sampler in accordance with the remainder of the present invention.

The sampler of the present invention will be attached in proximity to the sample location on the conveyor by a mount. The mount could be any type of a hardware device capable of allowing for the clamping or other attachment of the sampler of the present invention to the body of the conveyor and it will be understood by those skilled in the art that many different types of mounts and mounting hardware could be used all of which are contemplated within the scope of the present invention.

In addition to the mount, the sampler would also comprise a rotatable extractor for engaging the sample aperture on the body of the conveyor. The rotatable extractor would effectively attach via the sample aperture onto the body of the conveyor such that material flow from the flow stream to the outside of the conveyor body, via the rotatable extractor, could be recovered at the exterior of the conveyor. The rotatable extractor would only permit the passage of particulate material from the flow stream to the outside of the conveyor body when actuated—upon actuation, the rotatable extractor would permit the periodic capture and discharge of particulate material samples of controlled sized from the flow stream to a sample discharge outlet outside of the conveyor. There would also be a rotational power source operatively connected to the rotatable extractor for actuation of the rotatable extractor as outlined.

In operation of the sampler of the present invention, the rotatable extractor would not interfere with any material flow assistance device within the conveyor—for example if the conveyor itself was an auger containing a primary auger flighting therein, components of the rotatable extractor engaging and/or extending into the body of the conveyor would need to do so in a way that they did not interfere with the operation of the flighting. Similarly, if for example the conveyor was a belt conveyor, having a conveyor belt for a material flow assistance device therein, components of the rotatable extractor engaging and/or extending into the body of the conveyor would need to do so in a way that they did not interfere with the conveyor belt or its components.

During operation of the material conveyor, the rotatable extractor would be actuated by the rotational power source to capture periodic samples from the operating flow stream within the conveyor, which would be discharged at the sample discharge outlet. The periodic capture samples could be aggregated or otherwise processed—by only allowing the flow of particulate material from the flow stream to the exterior of the conveyor body during actuation of the rotatable extractor, an ongoing leak or steady flow of particulate material via the sample aperture would be avoided.

The rotatable extractor of the sampler of the present invention could take many forms. At least two specific formats of the rotatable extractor which are contemplated for use in conjunction with the remainder of the sampler and the methodology of the present invention are the use of a extractor flighting, or a small auger capable of effectively augering periodic samples out of the flow stream within the conveyor, or alternatively the use of a rotationally attached extractor which could be rotated and having an intake end adapted to permit for periodic scooping of material from the flow stream in the conveyor. These will be outlined in further detail herein below. It will also be understood to those skilled in the art of the development of devices of this nature that there are other types of extractor assemblies which can also be used to achieve the same goal as this particular element of the invention, and they are all contemplated within the scope hereof.

The sampler of the present invention could also include a sample receptacle mounted in proximity to the sample discharge outlet, permitting the reception or capture of the discharged periodic samples from the sampler. Embodiments of the sampler including a sample receptacle could be across the spectrum of complexity, from something as simple as a pail or the like being hung in proximity to the sample discharge outlet, to an integrated sample receptacle—any such modifications or alterations will be understood to those skilled in the art and are again obviously intended to be within the scope of the present invention.

One key embodiment of the sampler of the present invention could comprise a rotatable extractor consisting of a helical extractor flighting having an intake end and a discharge end. The helical extractor flighting could be used within an extractor to which has an attachment end for attachment to the sample aperture of the conveyor, and a discharge end comprising the sample discharge outlet through which the periodically captured particulate samples will be discharged outside of the conveyor. Rotation of the extractor flighting within an associated extractor tube by the rotational power source operatively connected thereto would result in the intake end of the extractor flighting extracting a sample quantity of particulate material from the flow stream for discharge at the sample discharge outlet. Use of a flighting or auger approach as the extractor of the present invention would allow for the controlled capture of samples on a periodic basis. For example, the flighting would only be actuated or powered by the rotational power source when the capture of a sample was desired. Staggering the actuation of the rotational power source would stagger the actuation of the extractor and result in the capture only of periodic samples from the flow stream in the conveyor. Use of a flighting or auger as the extractor would provide one approach via which a measured amount of particulate material could also be captured or discharged from the flow stream—the auger would only permit the evacuation of a permissible quantity of particulate material from the flow stream within the conveyor and as such a free-flowing sample would not be captured resulting in the capture of too much material, or in certain other cases where there might be a bridging of material within or in proximity to the sample aperture within the body of the conveyor resulting in a limited amount of particulate material flow—standardized amounts, extracted in a standardized way, from the flow stream of the particulate material within the conveyor would be achieved in accordance with this invention.

Where the extractor comprises a helical extractor flighting having an intake end and a discharge end, and an extractor tube having an attachment end for attachment to the sample aperture of the conveyor and a discharge end comprising the sample discharge outlet, rotation of the extractor flighting by the rotational power source would result in the intake end of the extractor flighting extracting a sample quantity of particulate material for discharge at the sample discharge outlet. The helical extractor flighting could extend within the body of the conveyor and out into the flow stream, or in other embodiments, the helical extractor flighting could end in proximity to the intake end of the extractor tube such that the flighting would not extend substantially into the flow stream within the body of the conveyor—in this approach, the likelihood of interfering with the material transfer assistance apparatus within the conveyor would be mitigated, and the objective of metering at periodic times the sample capture in accordance with the remainder of the present invention will still be achieved.

Certain types of conveyors in respect of which the sampler of the present invention could be used are those known in the industry as swing away conveyors that have a boot between sections. A swing away conveyor is used to position the intake or capture of the device beneath a truck or other discharge of material, and to take up that material for placement into a large diameter or longer length linear conveyor. Typically, the drop section where the swing away portion of such unit discharges, to place the captured particulate material into the main conveyors flow stream, is called the boot. The flow stream of material within the boot is typically vertical, with material dropping from one discharge down onto another intake. The sampler of the present invention could be mounted on the boot, such that the flow stream from which the samples in accordance with the remainder of the system and method of the present invention or capture samples captured from a vertical flow stream instead of an angular or horizontal flow stream. It will be understood that the modification if any required to deploy the sampler of the present invention on such a two-part swing away conveyors is contemplated within the scope of the present invention as well.

Another embodiment of the sampler the present invention could use an extractor tube instead of an extractor auger as the rotatable extractor element of the sampler in the present invention. In such an embodiment of the sampler in accordance with the remainder of the present invention the extractor could comprise an extractor to having an intake and a discharge end, and the mount of the sampler could rotatably mount the extractor tube to the conveyor such that the extractor tube could rotate within the flow stream inside the conveyor at its intake end. The intake end of such an extractor tube could be modified, with a scoop shaped profile or the like, to permit only the periodic capture of sample material in the flow stream within the conveyor when the extractor tube is rotated. The extractor tube could be rotated either periodically dependent upon its configuration, when only periodic rotation was required to result in periodic sample capture, or in other explicitly contemplated embodiments, the extractor tube by the operatively attached rotational power source could be constantly rotated, with a scoop configuration or the like at the intake end of the tube within the flow stream of the conveyor such that each time the scoop shaped profile of the intake end of the extractor tube reached a particular arc on the rotation, material would be captured from the flow stream within the scoop and eventually directed towards the discharge in the extractor tube. In embodiments of the sampler of the present invention where the rotatable extractor comprises a rotatably mounted extractor tube, the mount itself via which the extractor tube could be mounted to the body of the conveyor might comprise a bearing, bushing or the like. Any number of different types of specific rotatable mounts can be contemplated and will be understood to those skilled in the art to be within the scope of the present invention.

The rotational power source of the sampler of the present invention would be a motor or any other type of rotational power source providing steady rotation to the extractor tube, or the extractor flighting embodiments of the sampler using a flighting instead of the tube. Where the rotational power source comprises a motor, or comprises drive components connected to some type of a rotary power source, the rotary power source itself could be electrical or hydraulic in nature.

In addition to the sampler of the present invention, which could be retrofit or attached to an existing conveyor by adaptation to a sample aperture thereon, the present invention also comprises a particulate material conveyor including a periodic sampling device in accordance with the present invention. The particulate material conveyor of the present invention would include a substantially tubular body having an intake and discharge, a material flow assistance device within the body for the movement of the flow stream within the conveyor, power means for operation of the material flow assistance device, sample aperture allowing material flow from the flow stream to the outside of the conveyor body at a sample location, and a sampler in accordance with the remainder of the present invention attached to the conveyor at the sample aperture. In such an embodiment of the invention, the rotatable extractor of the sampler would not interfere with the material flow assistance device within the conveyor, and during operation of the conveyor, the rotatable extractor when actuated will capture periodic samples from the operating flow stream within the conveyor for discharge at a sample discharge outlet. Thus, in addition to the actual sampler device of the present invention is explicitly contemplated and intended that the claims outlined herein encompass both the sampler device for attachment to a pre-existing conveyor, as well as a conveyor integrating the sampler of the present invention at a sample aperture thereon. The sampler could be attached at the factory, and even mounted in a permanent OEM fashion, or could be attached post manufacture. Similar to embodiments of the sampler itself outlined herein, the conveyor of the present invention is explicitly contemplated to comprise an auger or a belt conveyor, but could also comprise for example an air driven material transport conduit system or the like.

In addition to the sampler and the conveyor of the present invention, there is also disclosed a method of obtaining periodic material samples from a flow stream of particulate material within a tubular conveyor, wherein the conveyor contains a material flow assistance device within a tubular body for the movement of a flow stream within the conveyor and also comprises a sample aperture allowing material flow from the flow stream to the outside of the conveyor body at a sample location. The conveyor comprises a sampler for use in conjunction therewith, which comprises a mount by which the sampler is attached to the body of the conveyor in relation to the sample location, a rotatable extractor for engaging the sample aperture on the body of the conveyor which when actuated will permit the periodic capture and discharge of particulate material samples of a control size from the flow stream to a sample discharge outlet outside of the conveyor, and rotational power source operatively connected to the extractor for actuating. In operation of the method of the present invention the conveyor will be operated to create a flow stream therein from the intake end to the discharge end of the conveyor, and the rotational power source will be actuated in relation to the sampler whereby the rotatable extractor will capture periodic samples from flow stream and discharge them to the sample discharge outlet. The rotatable extractor does not interfere with any material flow assistance device within the conveyor, and during operation of the conveyor the rotatable extractor when actuated will capture periodic samples from the operating flow stream within the conveyor for discharge at the sample discharge outlet.

In the method of the present invention any conveyor using a sampler in accordance with the remainder of the invention disclosed herein is contemplated to be within the scope of the conveyor and sampler combinations used in accordance with the remainder of the method outlined.

In operation of the equipment and method of the present invention, periodically captured and controlled sized samples will be captured from the flow stream within a conveyor

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labelled with like numerals, and where;

DESCRIPTION OF THE INVENTION

The following discussion provides examples of embodiments of the inventive subject matter. Although each embodiment represents a single combination of inventive elements, the inventive subject matter is considered to include all possible combinations of the disclosed elements. Those of skill in the art will recognize that the described embodiment are examples of possible configurations of the invention, and are not intended to be limiting to the scope of the invention. Accordingly, the drawings and descriptions contained herein are to be regarded as illustrative of the invention as set forth in the accompanying claims.

Conveyor Types:

As outlined elsewhere herein, the present invention comprises a material sampler which can be used to extract periodic and metered samples of particulate material from a flow stream within a tubular conveyor of many types. The two primary types of tubular conveyors which are explicitly contemplated within the scope of the present invention would be either a tubular auger, which consists of a helical flighting within a body tube, having an intake and discharge end between which material can be conveyed by rotation of the flighting within the body tube, or secondly belt conveyor. A belt conveyor of this type typically has a conveyor belt mounted within a body tube which when the conveyor belt is actuated will result again in the carriage of material on the belt from an intake and to a discharge end of the body tube. Belt conveyors are less reliant upon a perfectly cylindrical body tube than the requirements of a helical flighting within an auger which requires a cylindrical body tube. A belt conveyor having some type of a tubular enclosure even of a different cross-sectional profile is also contemplated within the scope of the present invention—insofar as the sampler device of the present invention could still be used in association therewith. It will also be understood that in further embodiments of the present invention, a sampler practising the same general rotary capture method could also be used in a pneumatic tube conveyor system, and that is also intended to be covered within the scope of the present invention with whatever necessary modifications would be required in the rotatable extractor of the present invention to accommodate the pneumatic system.

Figure 1:
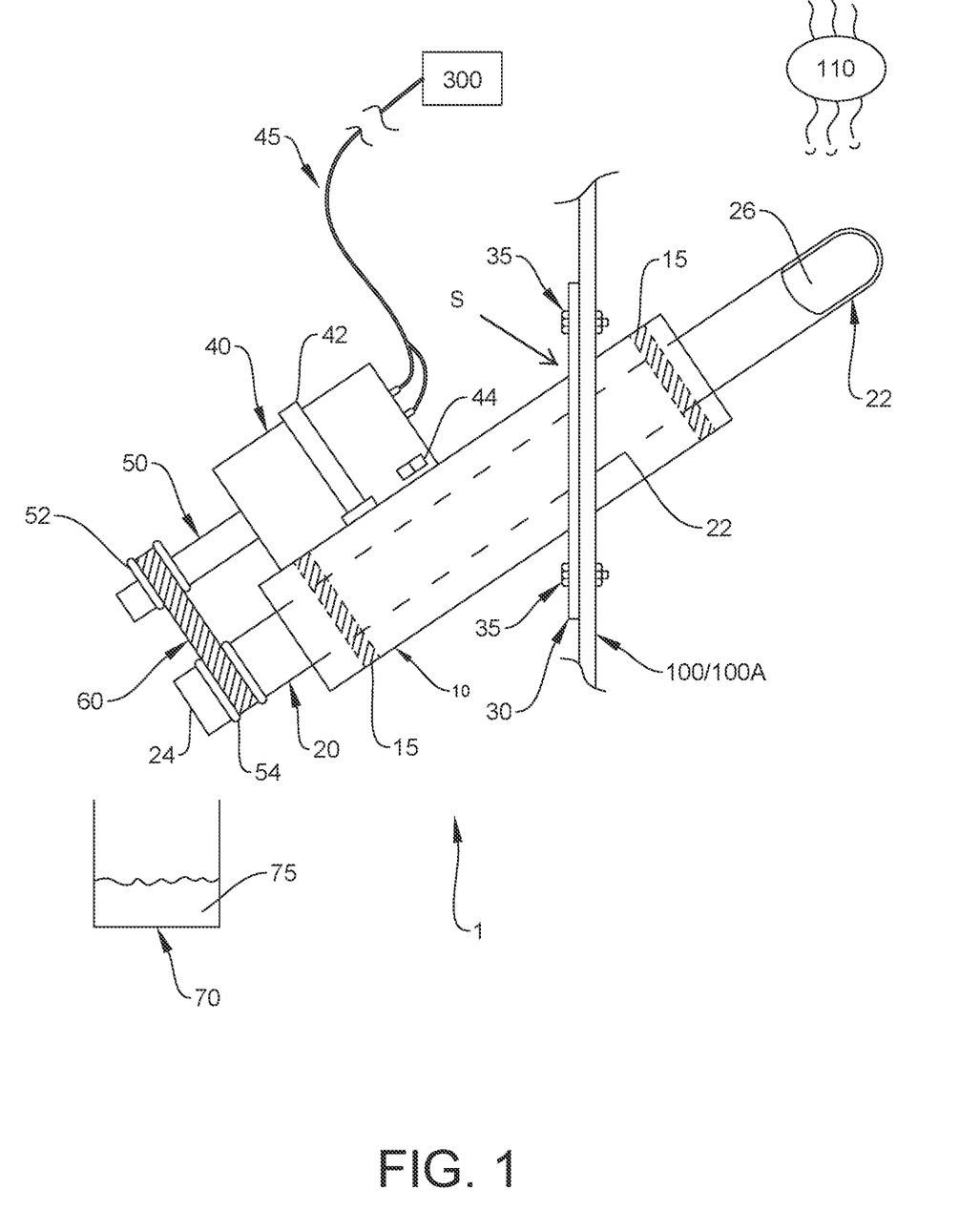
FIG. 1 depicts a detail view of one embodiment of a sampler in accordance with the present disclosure, wherein the rotatable extractor comprises a rotating extractor tube, and the sampler for demonstrative purposes is shown attached to a vertical side wall of a body of a conveyor.

Sampler:

FIG. 1 demonstrates one embodiment of a sampler in accordance with the present invention. The sampler 1 shown attached by a mount 30 to the side wall of the tubular body 100A of a tubular conveyor, shown at 100. The flow stream area of the particulate material which will flow within the body of the conveyor is shown at FS. The intake end of the sampler 1 can be seen disposed within the flow stream area FS. As outlined elsewhere herein, the sampler 1 will not interfere with the material flow assistance device within the body tube of the conveyor. The interior flighting of the conveyor is not shown in this Figure although it will be understood that in the particular embodiment shown in FIG. 1 the specific location of the attachment of the sampler 1 would potentially be to the side wall of the boot of a swing away conveyor. The rotatable extractor comprises an extractor tube 20 within a housing 10. Extractor tube 20 is sized such that it can freely rotate within the housing 10 which comprises a component of the mount of the sampler 1 to the conveyor.

The extractor tube 20 has an intake end 26 and a discharge end 24. The intake end 26 which is shown is shaped into a scoop structure by partially cutting away the wall 22 of the discharge tube 20. In the embodiment of FIG. 1, this scoop-shaped intake end 26 of the extractor tube 20 can receive particulate material from the flow stream within the conveyor, and direct it into the interior of the extractor tube 20, where it will flow under influence of gravity in the embodiment shown to exit the extractor tube 20 at the discharge end 24. The sample 75 can be seen placed into a receptacle 70. In these cases, it will be preferable that the extractor tube 20 be oriented at an angle relative to the surface of the earth such that the interior of the tube will be sloping downward, such that gravity assists the flow of material through the interior of the tube. In some cases, an angle of 30° relative to the surface of the earth will be preferred. In other cases, angles greater or less than 30° may functional sufficiently well. In addition, the mount can also be adapted such that the angle of the extractor tube can be varied, depending on the configuration of the conveyor or other implement to which it has been attached.

The mount 30 is shown, coupled with mounting hardware 35, for the attachment of the sampler 1 to the wall of the conveyor. The sampler 1 will pass through a sample aperture in the wall 100A of the conveyor 100. In some embodiments, the aperture in the wall of the conveyor will comprise an existing inspection/service access port. In their original configuration, these access ports are covered with removable covering plates, allowing a user to periodically inspect the interior of the conveyor. Conveniently, after removal of an inspection/service access port covering plate, the sampler can be mounted in the opening, obviating the need to modify the conveyor 100 itself in order to mount the sampler.

In some cases, the extractor tube 20 might be secured within a housing 10 by one or more support bearings 15 which are designed to support and allow the extractor tube 20 to rotate with minimal friction within its housing and within the flow stream of the particulate material within the conveyor. The bearings 15 are also effective to secure the extractor tube 20 in a fixed positional relationship relative to the conveyor housing such that the extractor tube 20 does not slide out of, or move longitudinally within, the housing inadvertently, and the alignment of the longitudinal axes of the housing and the extractor tube 20 is substantially maintained. The extractor tube 20 can be secured to the bearings 15 in a number of ways including by friction fit, by adhesives or otherwise, by which rotatable structures and housings are secured using bearings and similar mechanisms and structures. The bearing will preferably be like those known to those of skill in the art, where one part is secured to the inner wall of the housing, a second part is secured to the other surface of the hollow tube, and the bearing armature permits the relatively free rotation of the portion secured to the housing relative to the portion secured to the hollow tube. Rotation of the tube assists in facilitating the continued movement of material being sampled from the flow stream through the hollow tube and into the sample receiver, such that the hollow tube is unlikely to clog while in operation. In some embodiments, the bearings may comprise bushings or similar structure that will support the extractor tube 20, while allowing it to rotate relatively freely. In some embodiments, one configuration comprises an upper and lower bushing positioned analogously to the bearings 15 depicted in FIG. 1.

In the embodiment of FIG. 1, the rotational power source 40 comprises a motor. The motor, via a drive system, will rotate the extractor tube 20 resulting in the scooped extraction of particulate material from the flow stream within the conveyor. The drive system can have various configurations. In the illustrated embodiment, the drive comprises an electric motor 40 mounted on the side of the housing body via a drive mount 42. The motor will have a drive axle 50 extending from the motor. Towards the end of the axle, a motor drive wheel 52 is attached. On the hollow tube is also included a complimentary tube drive wheel 54. The motor drive wheel and hollow tube drive wheel are connected by a drive belt 60, effective to transfer rotational motion from the motor to the hollow tube. In the illustrated embodiment, the drive system is shown as comprising two pulleys connected by a belt. In other embodiments, the drive belt might take the form of a chain, and the two drive wheels would comprise sprockets that engage the chain. In still other embodiments, a direct drive system might be employed, where the motor drive wheel and tube drive wheel are in direct contact, obviating the need for a belt or chain or similar component. Or, in still other embodiments, a motor drive wheel might make direct contact with the outer surface of the hollow tube. All such arrangements are considered to be within the scope of the invention as disclosed and claimed.

Any of a number of types of motor are useable with the present invention. In one embodiment, the motor can be an electric motor that is powered by the electrical system of the farm implement that operates a grain auger or similar system. As shown, the motor may be connected to a power source 300 by a wiring harness 45 that transmits electrical energy from the power source to the motor. In some embodiments, the wiring harness may include a 7-pin plug that is compatible with the on board 12-volt power supply of a tractor or other implement. In some embodiments, it might also be preferable to have a motor that is battery drive and to have a rechargeable battery system as the power source. A self-contained system provides the advantage of obviating the need to connect the sampler to a farm implement, which may or may not have a convenient source of electrical power available. In a simple embodiment, a control switch 44 is included to enable an operator to turn the drive system on and off as desired. Additional controls such as rheostats and other well-known ways to vary the speed of electric motors are also compatible with the system, such that the speed of rotation of the hollow tube can be varied by controlling motor rpm. The ultimate speed of rotation of the hollow tube might also be dictated by the drive ratio between the motor and hollow tube, through the use of different size drive wheels and the like.

In one embodiment, attaching the sampler to a particulate conveyor will typically involve drilling one or more holes in the side of the implement large enough to admit the part of the housing and hollow tube that will extend into the interior of the particulate conveyor. The length of the portion of the extractor tube 20 that extends into the interior of the implement will be sized such that the end of the tube will be positioned substantially within the middle of where the material stream 110 will flow when the implement is in operation. The system can then be secured with commonly used fasteners 35 such as nut and bolt combinations which will extend through the mounting flange and the side wall of the particulate conveyor. An advantage of the present system is that it can be easily mounted to existing equipment, or provided as an original equipment option, depending on the preference of the user. For example, in some cases it may be possible to use pre-existing inspection access ports as a mounting location for the sampler on a conveyor.

As shown above and described herein, the intake end 26 of the extractor tube 20 is formed with a cutout or scoop-shaped portion. As the tube is rotated, the cutout will be continually be rotated through 360°, so that at some times it is facing substantially upwards into the material stream, thereby admitting material (e.g., grain) into the interior of the extractor tube 20 where the material will then pass through the tube by gravity. As the extractor tube 20 continues to rotate, at certain times the scoop or cutout portion within the material flow stream will be facing substantially downwards—in this particular instance a vertically oriented flow stream—thus resulting in effectively no material entering the extractor tube 20. The net result is the system provides the ability to acquire a "pulsed" sampling over time, where discrete volumes of sample are collected, separated by a time interval where a sample is not collected. By varying the speed of rotation of the extractor tube, and/or the rate of flow of material within the implement, an operator can achieve samples of various volumes. For example, with a high rotation rate and low material flow rate, the sample size will be reduced. Conversely, with a slow rotation rate, and high material flow rate in the implement, sample size can be increased.

As discussed above, the system can include various forms of controls and metering to allow more precise sample collection. For example, the system could include a rheostat or similar electrical control to allow a user to vary the speed of the motor, along with a readout to indicate what the speed of the motor is at any particular setting selected by the operator. In addition, the sample receiver may be calibrated for volume to allow a user to easily determine what volume of grain or other material being sampled are being collected at certain motor speed. Conveniently, the system could be provided with a conversion chart to enable a user to rapidly select a motor speed to achieve a certain sample size, without the need to know the actual flow rate of the material stream being sampled.

Figure 2:
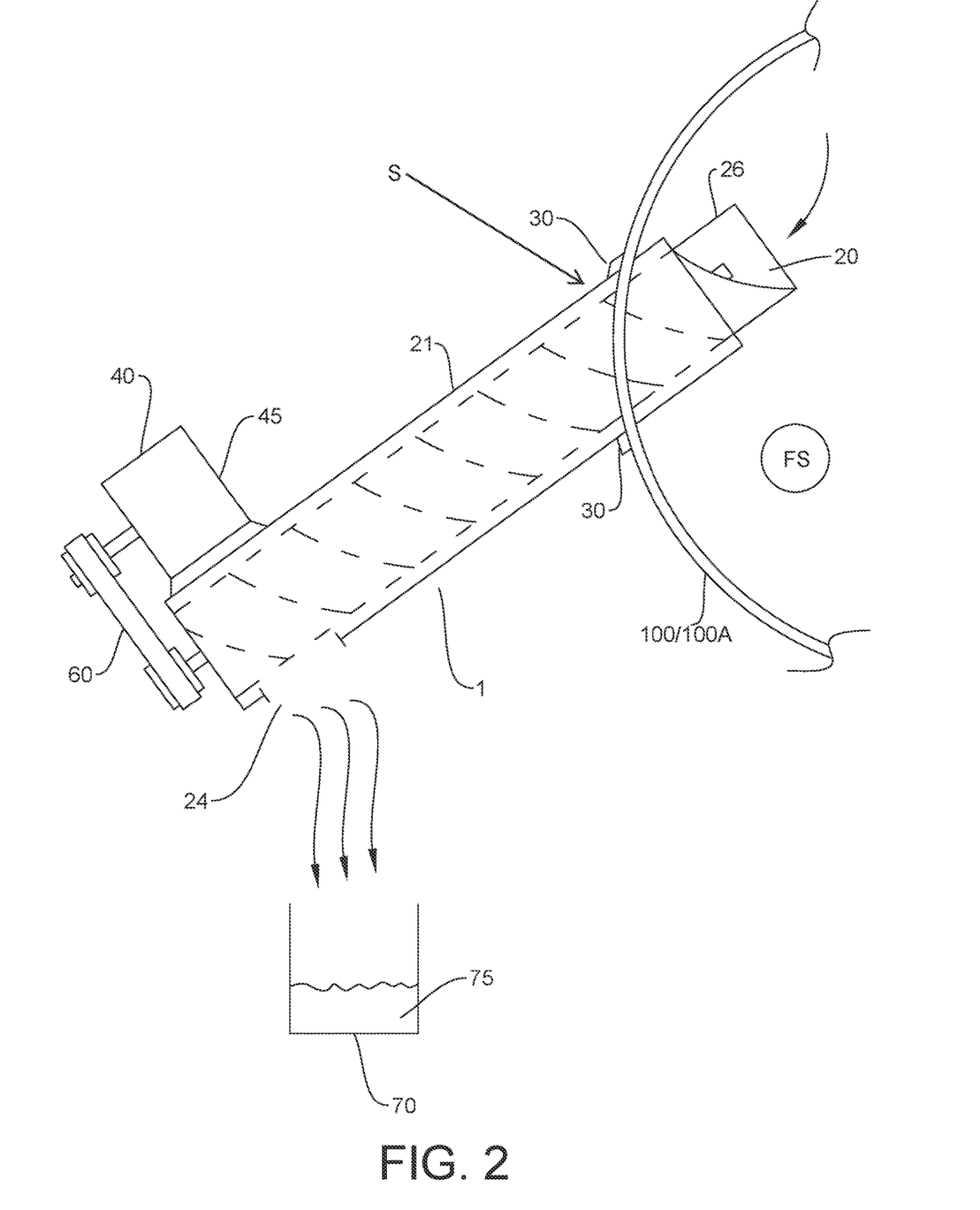
FIG. 2 depicts a detailed view of an alternate embodiment of a sampler in accordance with the present disclosure, wherein the rotatable extractor comprises an extractor flighting within an extractor tube, and the sampler for demonstrative purposes as shown attached to a curved side wall of the body tube of a tube conveyor.

FIG. 2 is a detailed schematic figure showing an alternate embodiment of the sampler 1 of the present invention, wherein the rotatable extractor 20 comprises an extractor flighting 21 operating within an extractor tube 20. Each of the extractor flighting 21 and the extractor tube 20 has intake ends, and discharge ends. The intake end 26 of the extractor flighting 21 is shown, along with the discharge end 24 in proximity to the discharge outlet of the extractor tube 20. The extractor flighting 21, operatively connected to the motor 40 by a drive belt 60, when actuated by the motor 40 will by operation of the flighting auger measured amounts of particulate material from the flow stream FS, through the extractor tube 20 for discharge—again there is a receptacle 70 shown for demonstrative purposes only. The receptacle itself does not form a mandatory element of the broadest claimed embodiments of the present invention.

The embodiment of FIG. 2 is shown attached to the curved side wall of a tube conveyor. In the particular embodiment shown, the extractor flighting 20 extends beyond the intake end of the extractor tube 20, into the flow stream FS. Again, there is no material transfer assistance device shown in this Figure—such as an auger flighting or auger conveyor within the conveyor wall 100, but it will be understood that to the extent that an interior apparatus exists within the wall 100, the sampler of the present invention will be configured so not as to interfere with the operation of such apparatus.

Figure 3A:
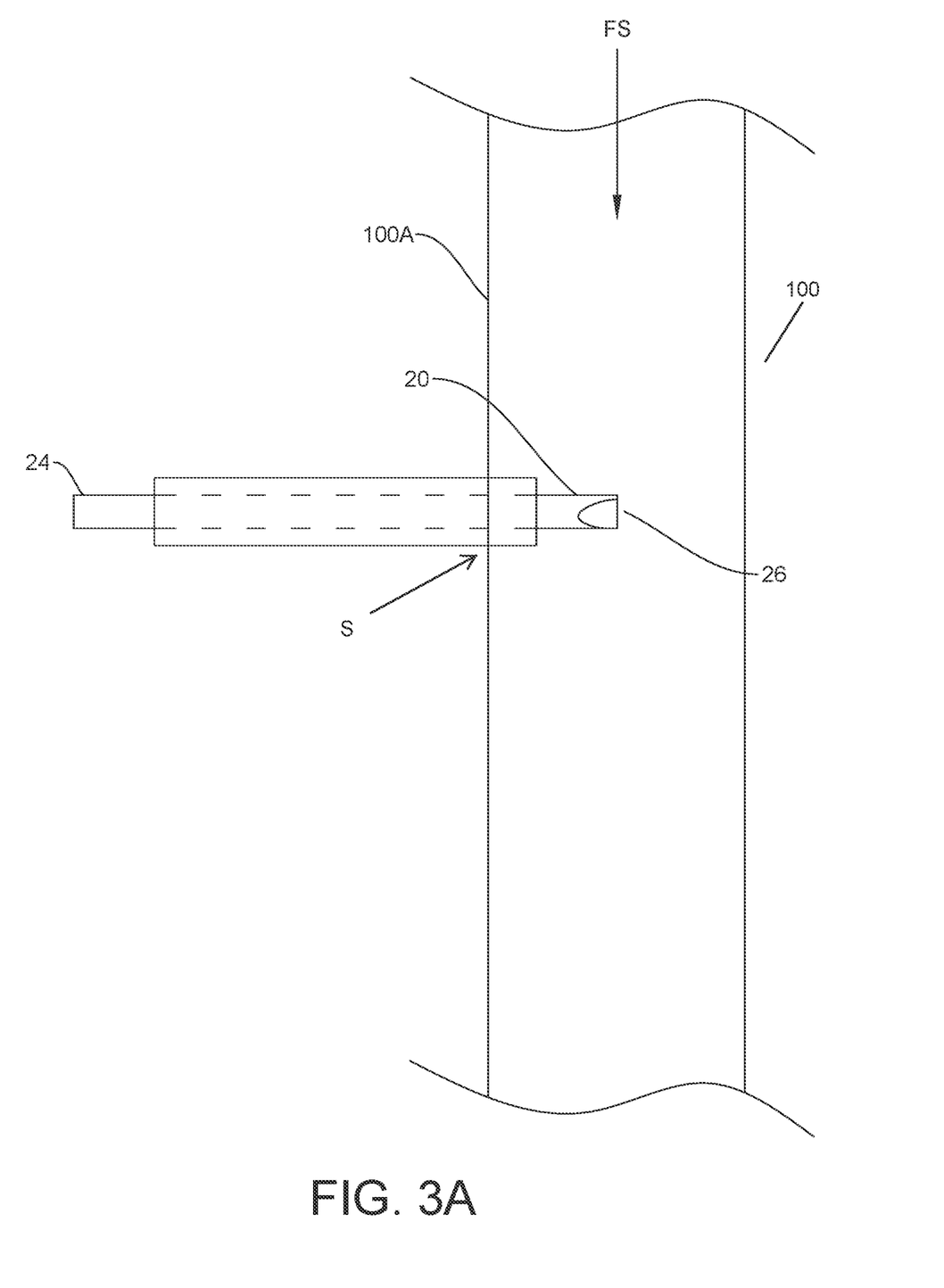
FIGS. 3A through 3D demonstrate in cross section three different configurations of the sampler of the present invention attached to the body of a tube conveyor.
Figure 3B:
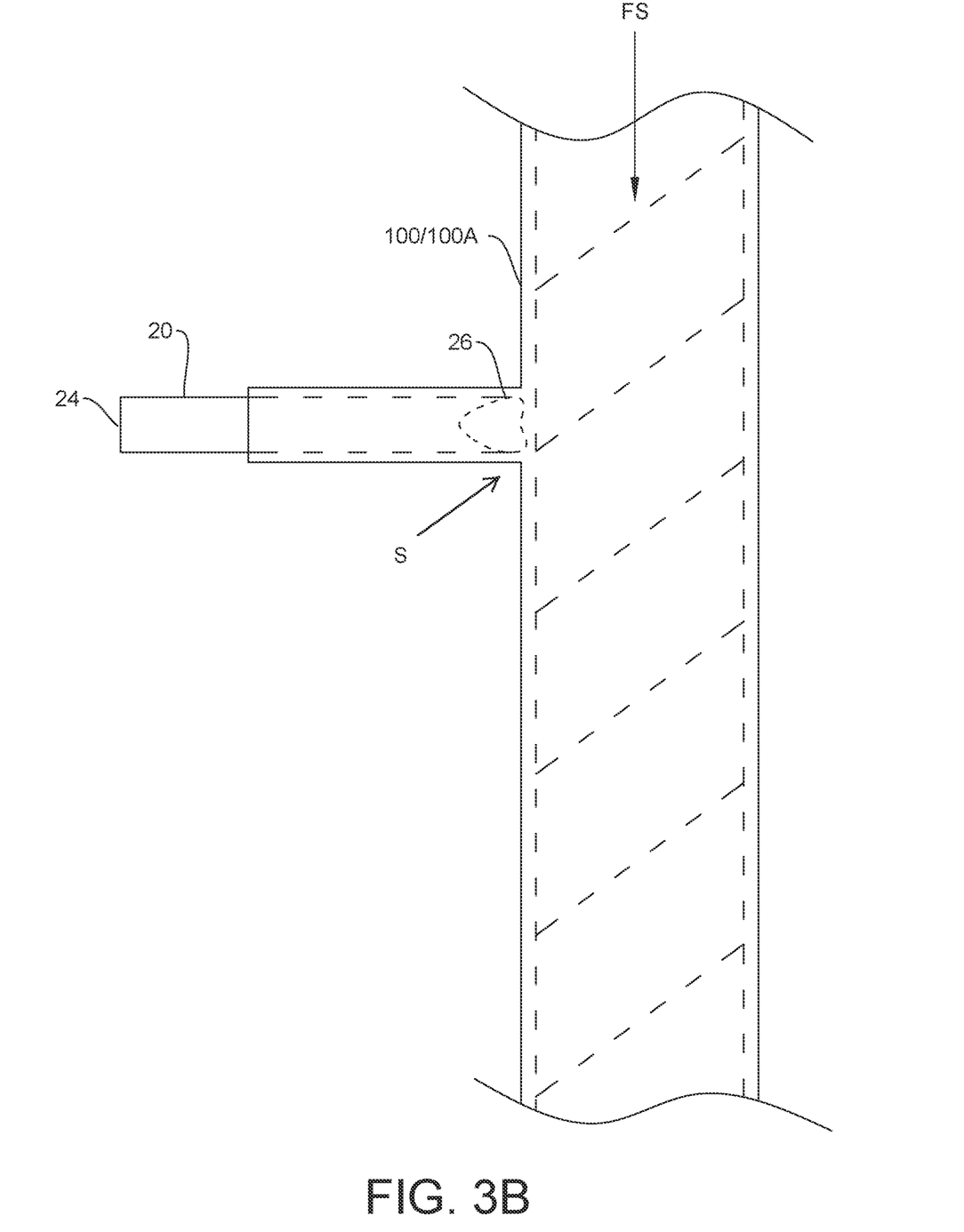

FIGS. 3A through 3D are cutaway schematic figures intended to demonstrate the configuration of different types of rotatable extractors in accordance with the sampler of the present invention, intended to demonstrate the use of the invention with different types of conveyors with different types of interior equipment. FIG. 3A shows an embodiment similar to the FIG. 1, wherein the rotatable extractor comprises an extractor tube 20 with the scoop-shaped intake end disposed within the flow stream FS of the conveyor. In an alternate embodiment using an extractor tube 20 within a housing 10, FIG. 3B shows the intake scoop end 26 of the extractor tube 20 is located in proximity, within the housing 10, to the sample aperture in the wall 100 of the conveyor—this type of an embodiment is intended to allow for the measured extraction of samples in accordance with the present invention where there is auger flighting shown within the primary conveyor tube which cannot be interfered with by operation of the sampler of the present invention.

Figure 3C:
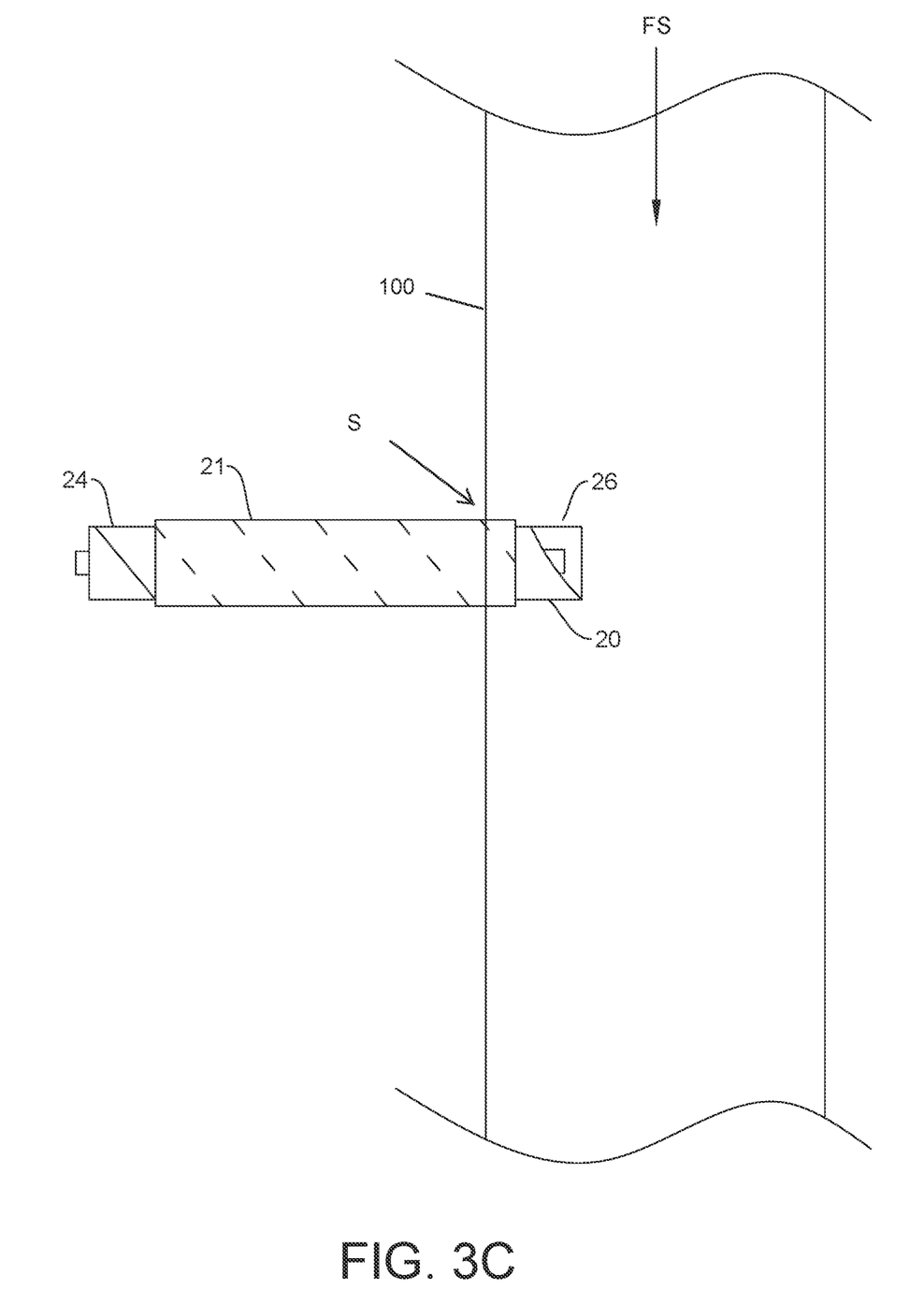
Figure 3D:
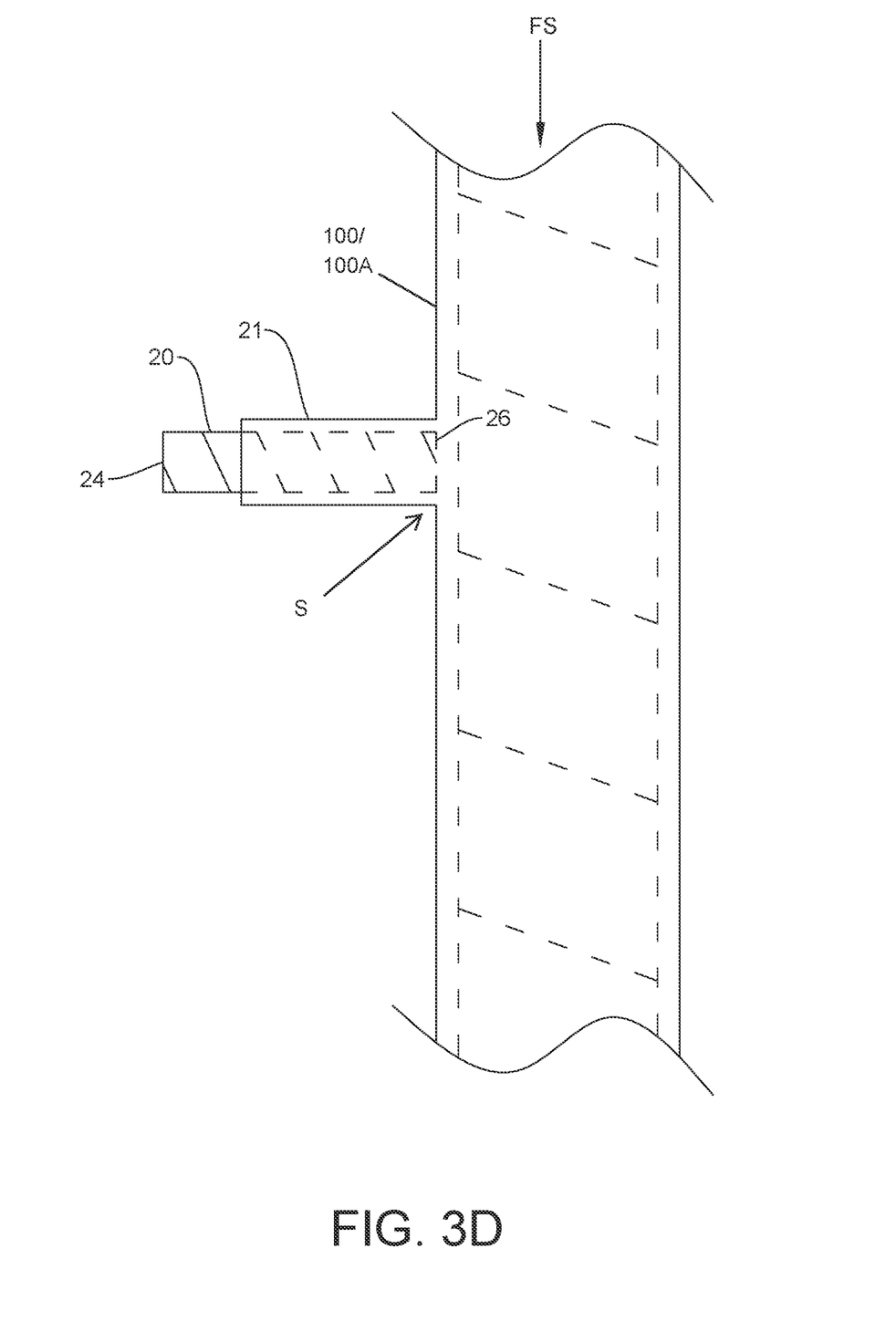

FIG. 3C is one cutaway view of an embodiment of the sampler and conveyor of the present invention where the sampler comprises an extractor flighting 21 within extractor tube 20, with the intake end 26 of the extractor tube 20 disposed within the conveyor and within the flow stream FS. FIG. 3d shows a schematic of a further embodiment of the sampler of the present invention wherein the rotatable extractor comprises an extractor flighting 21, with the intake end 26 of the extractor tube 20 located within the sample aperture of the wall of the conveyor, but in such a way that it does not interfere with the primary auger flighting within the conveyor tube. These figures show only for schematic approaches to the configuration of the sampler of the present invention in conjunction with the tube conveyor of some types. It will be understood that there are other types of two conveyors including pneumatic tube conveyors or the like which could also be used in accordance with the remainder of the present invention and association with which the necessary modifications to the configuration of the sampler itself or the location of the intake end 26 of the extractor tube 20 could be affected to implement the operability of the present invention and association with those of the types of conveyors again all such approaches are contemplated within the scope of the present invention.

Figure 4:
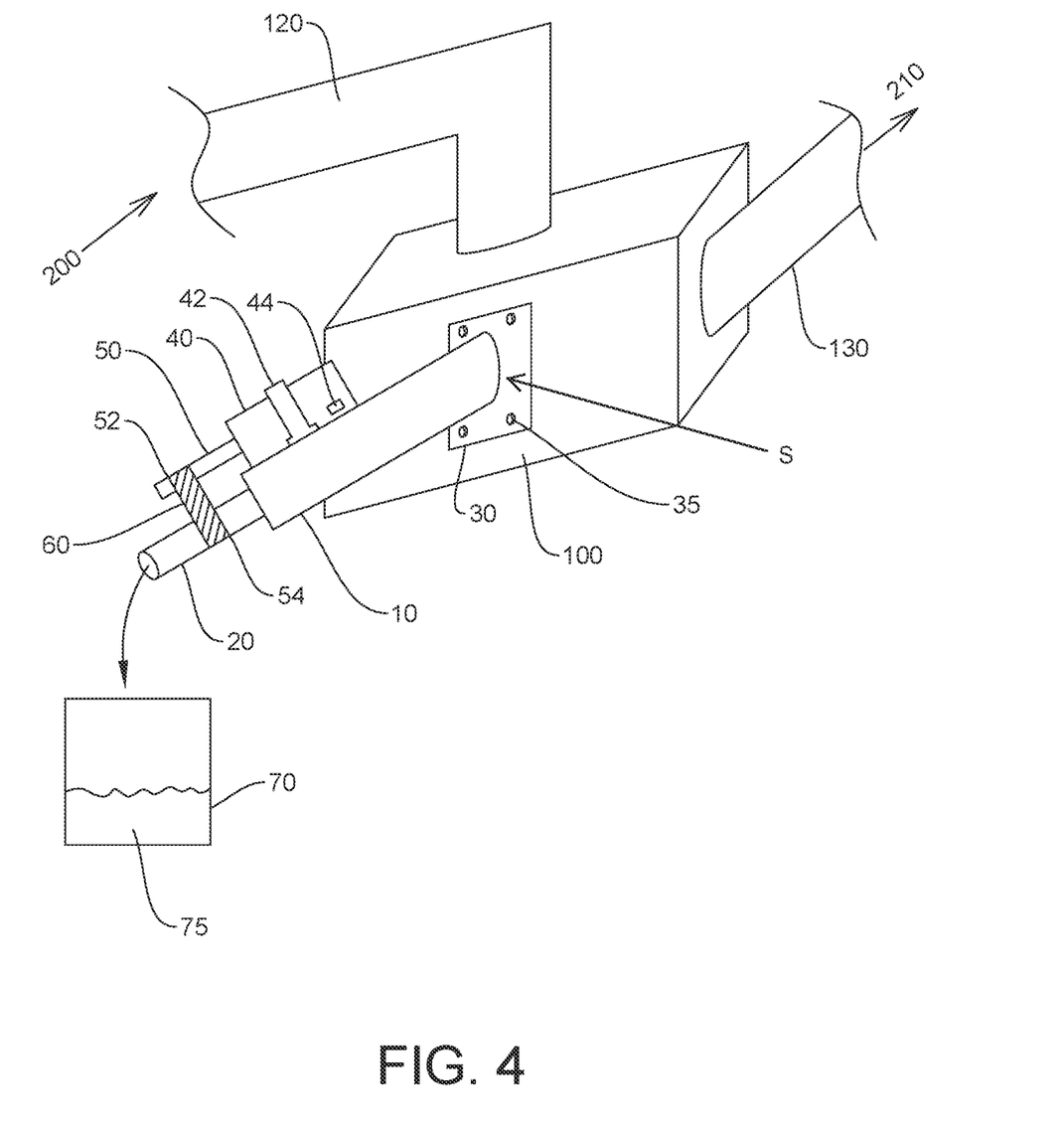
FIG. 4 depicts an embodiment of a sampler in accordance with the present disclosure, wherein the sampler is mounted on a swing away grain auger to provide an example of a method of use of the sampler.

Shown in FIG. 4 is one example of a conveyor and sampler as described herein. A sampler much like that illustrated in FIG. 1 and described above, can be secured to an implement 100, in this case, the junction of a swing away auger. The swing away auger can have a feed auger 120, with an inlet port 200 into which material is drawn up for transfer from one storage location to another. As shown, the feed auger includes an elbow such that the material falls downwards creating a material flow stream into which the hollow has been positioned by virtue of being mounted on the side of the implement. A swing way auger will also have an output auger 130 that then takes the material and sends it through an outlet port 210 to another storage location. The embodiment of FIG. 4 as illustrated shows only a cutaway view of the boot area of a swing away auger but it is believed to be sufficient for the purposes of demonstrating the idea using the sampler 1 of the present invention in conjunction with the vertically oriented flow stream in the boot of a swing away auger or in a similar application.

Figure 5:
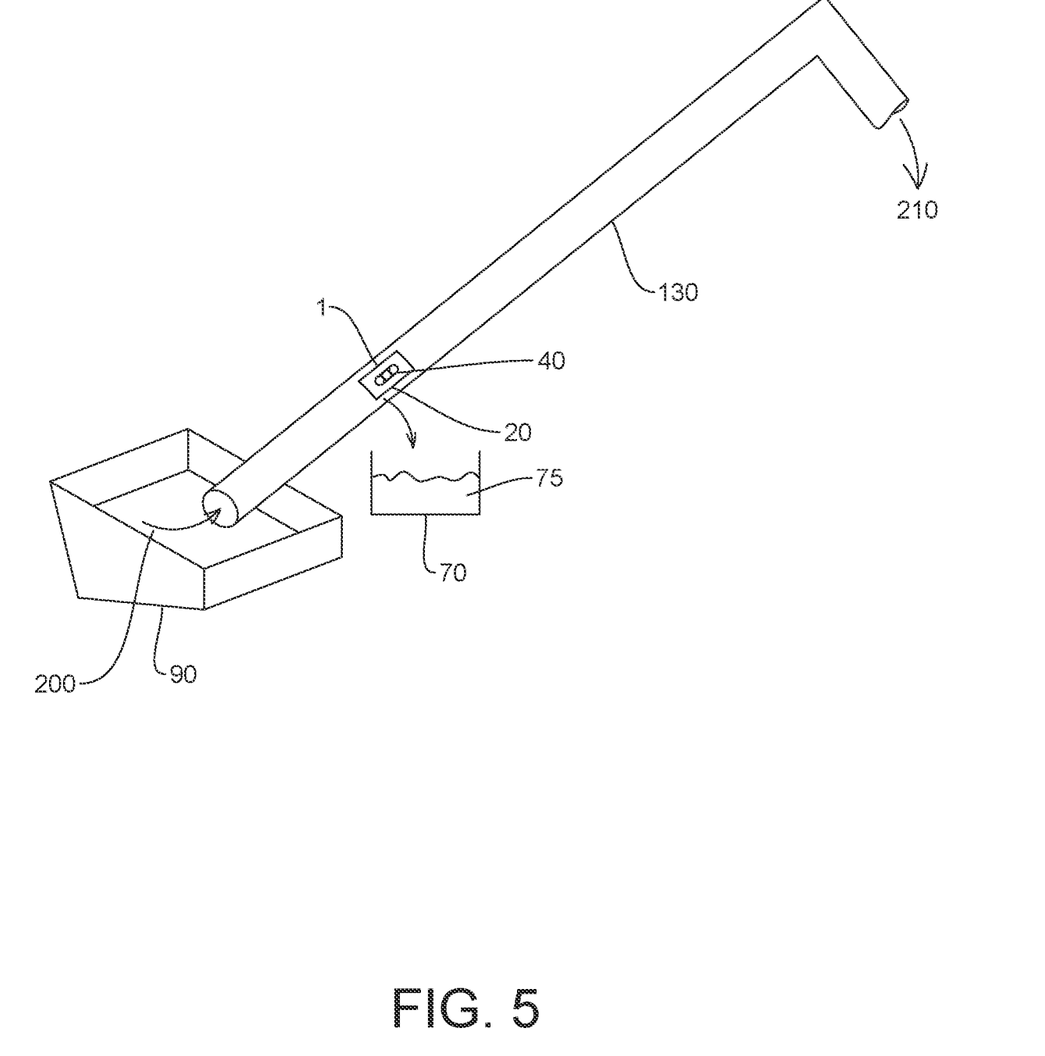
FIG. 5 depicts an embodiment of a grain sampling sampler in accordance with the present disclosure, wherein the sampler is mounted on the side of a conventional grain auger to provide an additional example of a method of use of the sampler.

The system is also adaptable to other types of uses as well. For example, and as depicted in FIG. 5, the sampler 1 might be secured to the side of a conventional auger and samples taken while the material is being transferred upwards from a first location 90 to a different location such as a storage bin. In this simpler arrangement, the inlet port 200 and outlet port 210 are part of a single auger tube.

Conveyor Apparatus:

As claimed and discussed elsewhere herein, it is explicitly intended that the subject matter of the present invention encompasses not only the sampler 1 as outlined but also a particulate conveyor 100 incorporating a sampler in accordance with the remainder of the present invention. Any conveyor incorporating sampler and sampling methodology outlined herein is explicitly intended to be encompassed by the subject matter and the claims of this invention. Both the sampler 100 for a retrofit application, as well as a conveyor 100 with a sampler built-in on an OEM basis are intended to be covered.

Sampling Method:

As outlined elsewhere above, the method of operation of the present invention, to capture periodic samples of controlled volume from within the flow stream of particulate material within a tubular conveyor is also intended to be within the scope of the present invention. The method of the present invention which is disclosed comprises using a conveyor equipped with a sampler in accordance with the present invention to capture control periodic materials and apples from a flow stream of particulate material within a tubular conveyor. The tubular conveyor contains a material flow assistance device within a tubular body for the movement of the flow stream within the conveyor and comprises a sample aperture allowing material flow from the flow stream to the outside of the conveyor body a sample location. The sampler is attached at the sample location, allowing upon actuation for the extraction of periodic material samples from the flow stream within the conveyor.

The first operating step of the method of the present invention is to operate the conveyor to create a flow stream of particulate material therein, travelling from an intake end to a discharge end of the conveyor. The sampler will be actuated by its rotational power source, resulting in the periodic controlled capture by operation of the rotatable extractor of periodic samples of particulate material from the flow stream for discharge at the sample discharge outlet. The rotatable extractor, as outlined above with respect to the apparatus, would not interfere with any material flow assistance device within the conveyor, and during operation of the conveyor, the rotatable extractor when actuated would capture periodic samples from the operating flow stream. The rotational power source of the sampler used in accordance with the method could be a fixed or variable speed, such that the quantity of material captured could be increased or decreased as required. As outlined in accordance with the remainder of the present invention actual conveyor of the method of the present invention could be an auger containing a helical fighting, a belt conveyor within a tubular body of varying cross-section, or even a pneumatic conduit system. Any type of a particulate material movement system which results in the movement of a flow stream of material from intake to a discharge, which could be fitted with a sampler in accordance with the apparatus of the present invention, could be within the scope of the method as well.

It should also be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A sampler for use in the controlled extraction of material samples from a flow stream of particulate material within a tubular conveyor having an intake and a discharge defining a linear travel path and distance of the flow stream therein, wherein the conveyor comprises:

a) a material flow assistance device within a tubular body for the movement of the flow stream within the conveyor, said flow assistance device having two ends corresponding to the intake and a discharge of the tubular conveyor; and b) a sample aperture allowing material flow from the flow stream to the outside of the conveyor body at a sample location in a mid-point of the tubular body located between the two ends of the linear travel path of the flow stream;

the sampler comprising:

a) a mount for attachment of the sampler to the body of the conveyor at the sample location;

b) a rotatable extractor which is configured to be actuated to permit the periodic capture and discharge of particulate material samples of a controlled size from the flow stream to a sample discharge outlet outside of the conveyor, said rotatable extractor comprising:

a. an extractor tube rotatably attached to the mount and having an intake end in communication with the flow stream through the sample aperture and having a discharge end comprising the sample discharge outlet; and a rotational power source operatively connected to the extractor tube for rotating same; wherein selective rotation of the extractor tube will result in the extraction of a sample quantity of particulate material from the flow stream for discharge at the sample discharge outlet; and wherein during operation of the conveyor:

the rotational power source is actuated to yield the discharge of an evenly extracted particulate sample from the flow stream at the sample discharge outlet from a mid-point of the operating flow stream during operation thereof; the rotatable extractor does not interfere with any material flow assistance device within the conveyor during operation thereof; and no component of the rotatable extractor will move closer to or further away from the material flow assistance device, eliminating the risk of equipment damage or fouling of the material flow assistance device by the rotatable extractor.

2. The sampler of claim 1 further comprising a sample receptacle in proximity to the sample discharge outlet, to receive the extracted particulate sample.

3. The sampler of claim 1 wherein the tubular conveyor is an auger, and the material flow assistance device is a flighting.

4. The sampler of claim 1 wherein the tubular conveyor is a belt conveyor, and the material flow assistance device is a conveyor belt.

5. The sampler of claim 1 wherein the mount comprises a bearing or a bushing.

6. The sampler of claim 1 wherein the rotational power source is a motor which provides rotation to the extractor tube and the intake end of the of the extractor tube only permits-entry of material from the flow stream into the extractor tube during each rotation of the extractor tube.

7. The sampler of claim 1 wherein the rotational power source is a hydraulic motor.

8. The sampler of claim 1 wherein the rotational power source is an electric motor.

9. The sampler of claim 1 wherein the rotational power source permits the adjustable actuation of the rotatable extractor, to vary the speed of sample recovery at the sample discharge outlet.

* * * * *